Oct. 9, 1956  D. B. BANKS  2,766,002
CATALYST UNLOADER
Filed Aug. 9, 1954  3 Sheets-Sheet 1
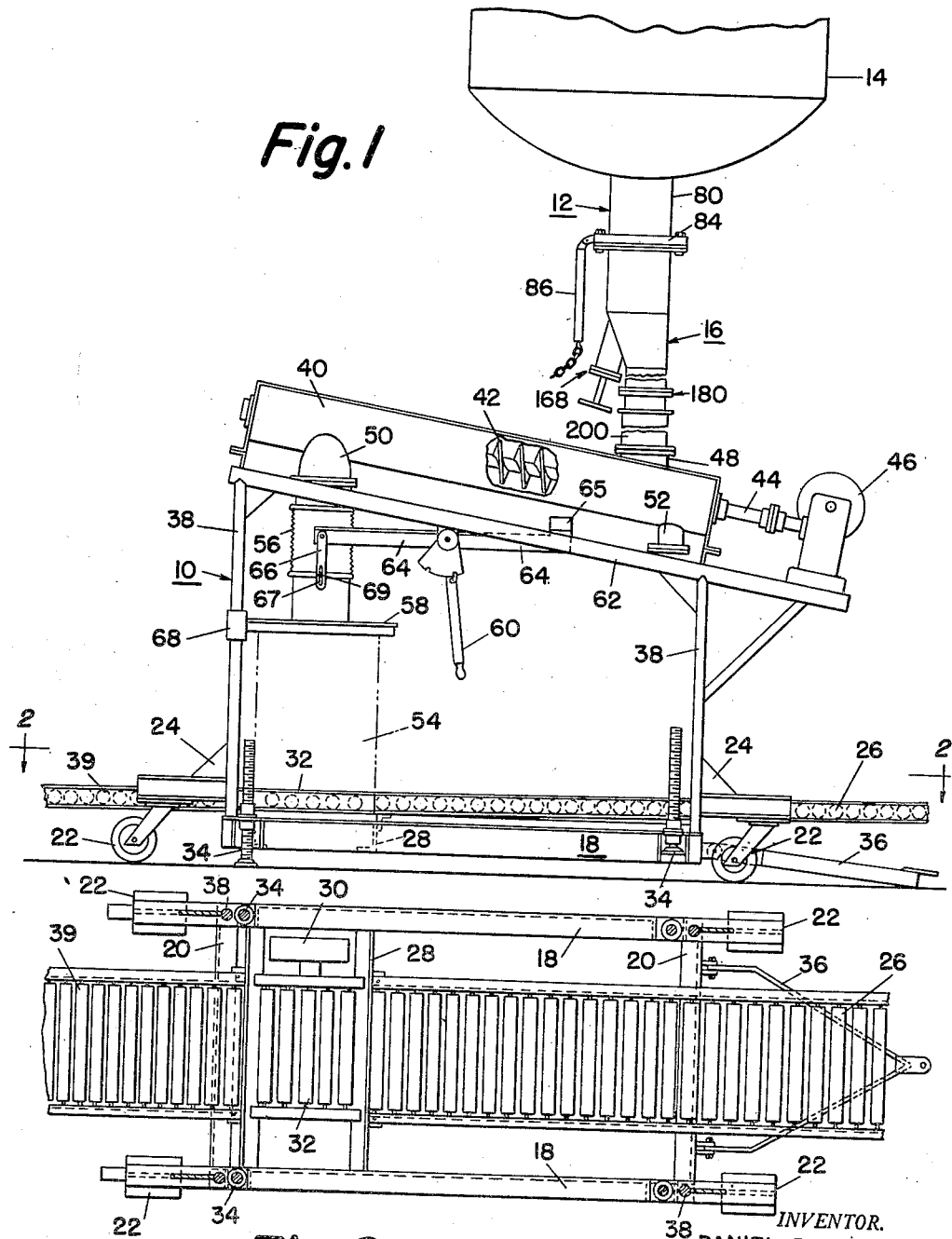
INVENTOR.
DANIEL B. BANKS
BY
Robert O. Spurdle
ATTORNEY

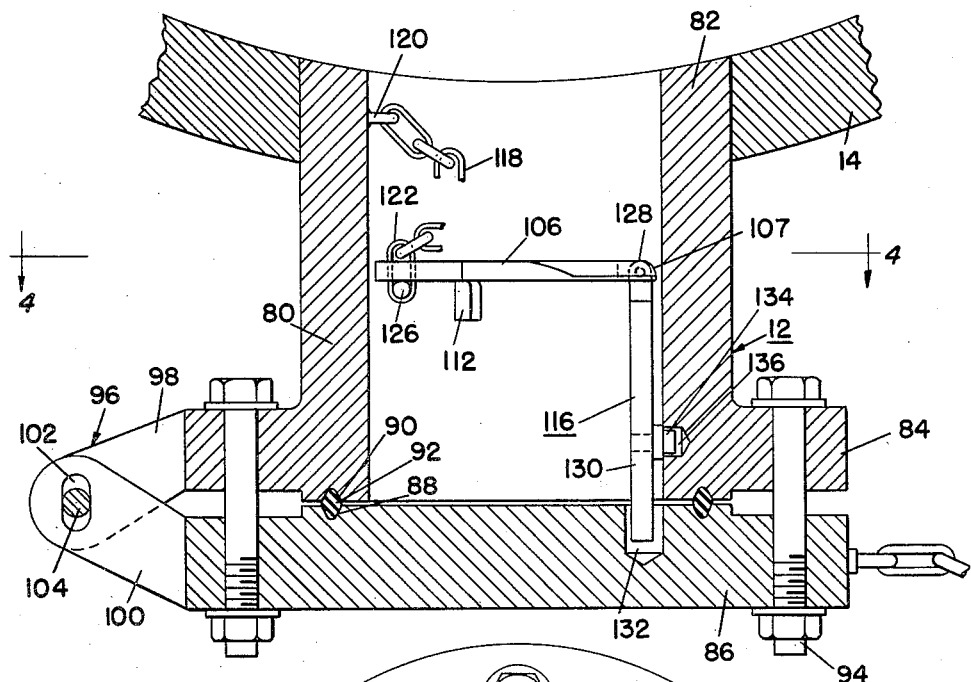
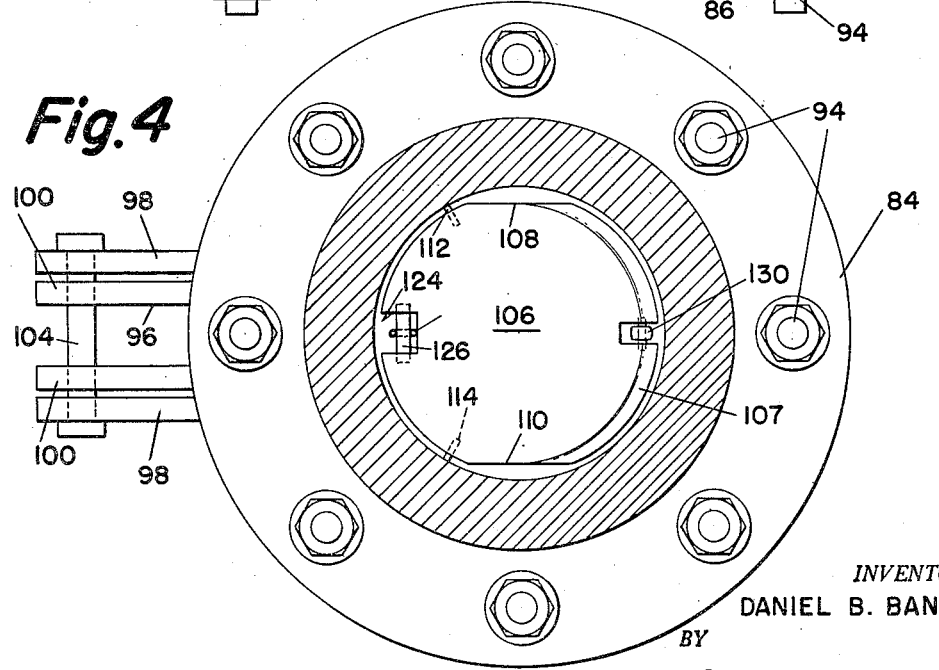

Oct. 9, 1956        D. B. BANKS        2,766,002
CATALYST UNLOADER
Filed Aug. 9, 1954        3 Sheets-Sheet 3
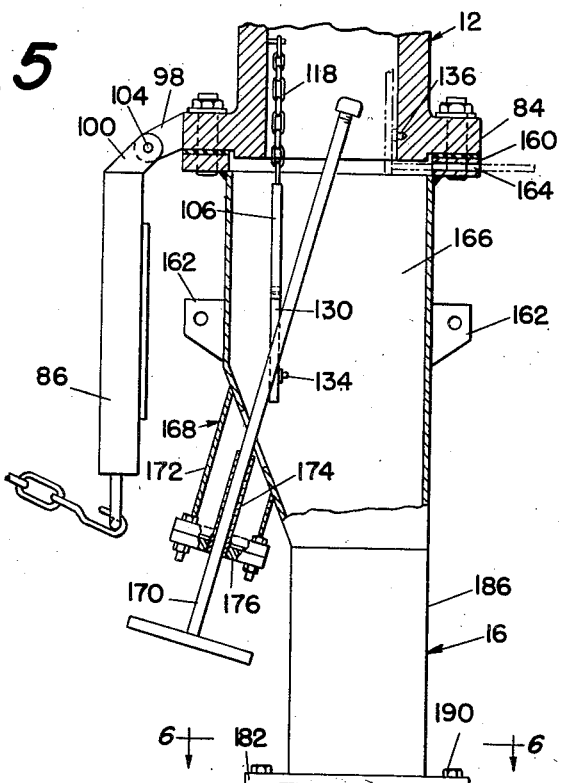
Fig. 5
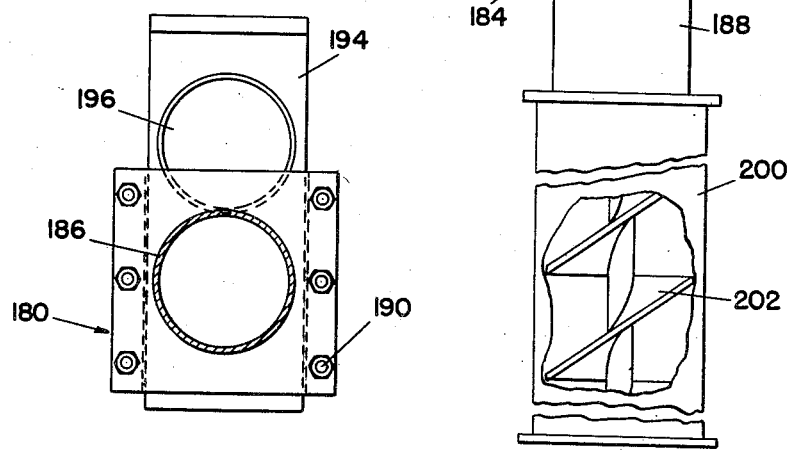
Fig. 6
INVENTOR.
DANIEL B. BANKS
BY
ATTORNEY United States Patent Office 2,766,002
Patented Oct. 9, 1956

2,766,002

CATALYST UNLOADER

Daniel B. Banks, Drexel Hill, Pa., assignor to Sun Oil Company, Philadelphia, Pa., a corporation of New Jersey Application August 9, 1954, Serial No. 448,729

7 Claims. (Cl. 249—60)

This invention relates in general to material handling and particularly to apparatus for controlling the discharge of comminuted solid materials from vessels after treating operations as is common in the petroleum and chemical industries.

Vessels used in these industries variously termed reactors, retorts, furnaces and the like, frequently must be discharged of solid materials accumulated therein. These solids may be a residue such as a carbon deposit, are heat-treated solids to begin with, such as coal, or are solids such as catalysts used in chemical processes which have become exhausted. In any case, it is necessary to discharge the vessel in order to re-establish it as an operating unit. The ease and safety, as well as the rapidity and completeness, of the discharging operation depends on the discharge device associated with the vessel. Additionally, as in the instance of spent catalysts, it is economical to conserve the discharged material for rejuvenation or sale. It is an object of the present invention to provide an unloading assembly designed to co-operate with conventional nozzles used for unloading such vessels which insures safe and economic operations.

In processes where the solid material in a reactor remains in a divided state and will flow if released, control of the material in a discharge operation requires extra precautions from both viewpoints of safety and economy. This is especially true where spent catalyst having a high resale value, such as platinum, is the material. It is an added object of the present invention to provide a mechanical unloading means easily adapted to existing discharge nozzles and similar closures which is durable, safe to handle and is adapted to conserve the discharged catalyst to a high degree.

These and other objects will be more fully disclosed in the following detailed discussion of the device as shown in the drawings, in which:

Figure 1 is an elevational view partly broken away of the combination of elements forming the device.

Figure 2 is a sectional plan view of a portion of Figure 1 taken on line 2—2.

Figure 3 is an elevational view in section of a portion of Figure 1 showing the nozzle in closed position.

Figure 4 is a plan view in partial section of Figure 3 taken on line 4—4.

Figure 5 is an elevational view partly broken away showing enlarged detail of Figure 1.

Figure 6 is a sectional plan view of Figure 5 taken on line 6—6.

Broadly described, the invention discloses a combination of elements and sub-combinations designed to co-operate in the safe and economical removal of spent catalyst. Means to receive the discharged material in controlled amounts is positioned under the discharging vessel. A chute connects the unloading nozzle of the vessel to the control mechanism of the receiving means. Elements cooperating with the retort nozzle release and keep moving the spent catalyst, while control by weight of the received mass in the receiving means prevents too rapid and unwieldy unloading. Thus, progressively in easily handled increments, the vessel is discharged economically and safely.

These functions of the separate elements and sub-combinations forming the device will be understood after reading the following detailed description of the figures of the drawing and the discussion of operation. Figure 1 shows the assembled combination in operating position. The receiving means generally denoted by the numeral 10 is positioned beneath the nozzle 12 of the vessel 14, both connected by the chute 16. These comprise the major elements of the combination, each being modified to cooperate with the other.

In Figures 1 and 2 the material receiving means 10 is in the form of a wheeled vehicle with a chassis constructed of longitudinally extending members 18 with connecting lateral members 20. Wheels 22 project downwardly below the chassis members from brackets 24. A portable roller platform 26, typical of well known conveyor systems, assists longitudinal movement of containers by extending across the front end lateral member 20 and connects to the intermediate member 28. Between intermediate member 28 and rear lateral member 20, a weighing scale 30, with roller platform 32 continuing the conveyor system, is positioned. Lift jacks 34 are positioned at the four corners for levelling and securing the receiving means 10 in operating position. This lower portion of the receiver is completed by indicating the draw bar 36 by means of which it is drawn into the unloading position on wheels 22. A separate portable roller section 39 is shown connected to the receiver chassis to assist in the operation.

Corner posts 38 extend upwardly at the four corners of the chassis adjacent jacks 34 to support the delivery control elements of the receiving means. An upwardly slanted cylindrical casing 40 supports a screw conveyor 42 connected by shaft 44 to operating motor 46. Flanged inlet 48 is positioned in the casing 40 to connect with chute 16. A material delivering connection 50 at the raised end of the casing 40 and a clean out connection 52 at the lower end complete the delivery control sub-combination.

The delivery connection 50 and the receiving receptacle 54, shown in phantom line, are connected by an expansible member 56 extending upwardly from the cover 58. Lever 60 pivotally suspended from support 62 is rigidly connected to lever 64 counterbalanced by weight 65 and connected by link 66 to the cover 58 to seat and unseat it during operation. Link 66 is slotted at 67 to engage through pin 69. This construction prevents any twisting movement of cover 58 and does not transmit the closing effect of lever 60 to the scale 30 as an addition to the weight of receptacle 54. A start and stop switch 68 is mounted as shown for the operator's use. In addition, a switch control, not shown, is coupled with the scale 30 whereby motor 46 is shut off when a preselected weight is reached. The reason for this will be evident in reading the operation characteristics of the device as reflected in the example given below.

In Figure 3, the typical vessel 14, the bottom of which is indicated only, positions the nozzle 12 in the closed position. The nozzle 12 is composed of a side wall 80 usually cylindrical in shape, welded into the vessel 14 at the upper end 82 and terminated by a flange 84 on the lower end.

A blind flange 86, circumferentially grooved as at 88 to oppose a like groove 90 in the engaging face of the flange 84, is adapted to form a closure for the nozzle 12. A seal ring 92 is fitted in the opposed grooves 88 and 90 and is pressed between the engaging faces of the flange 84 and the blind flange 86 to seal the nozzle. Fastening means such as bolts 94 position the closure 86 in sealing engagement. Hinge means 96 including upper and lower elements 98 and 100 extending from the flange 84 and blind flange 86 respectively are slotted at 102 to receive the pivot pin 104. By slotting the hinge members 98 and 100 as shown a certain amount of play is permitted, making the necessary alignment for successful closing easier than would be possible with a more limited opening.

Within the above nozzle 12, recognizable as a well known element by those versed in the art and normally forming the complete discharge means for such vessels, additional operating means as part of this invention is inserted. A plate 106, of sufficient thickness to support the load of solid material resting on it, is cut to fit easily into the nozzle 12 yet tight enough in fit to prevent the supported comminuted solid material from flowing around it. As seen in Figure 4 it is cut on a chord to its circumference at opposite points 108 and 110. These chord cuts are parallel to each other to permit the plate 106 to drop through the nozzle without binding once it is released. Free release is further assured by rounding the forward edge of plate 106 as at 107 between the chords 108 and 110 as shown, assuring clearance of the nozzle wall when that edge drops as released by latch 116.

Two support lugs 112 and 114 are welded at circumferential third points (120 degrees apart) inside the cylindrical body of the nozzle 12, and, together with the latch 116, hold the plate in closing position. A tie chain 118 of sufficient length to drop the plate 106 through the bottom of the nozzle and free and clear of the nozzle opening when released, is fastened on one end to the nozzle as by the ring 120. The other end is secured to the plate by passing the end link 122 through the plate notch 124, passing the rod 126 through the link, and welding the rod to the plate. This secures the plate in replacement position relative to the nozzle for quick closure after the discharging operation.

Cooperating with the closure 86 and controlling the release of the plate 106, the latch mechanism 116 pivotally engages the plate 106 at 128, a point midway between the lug supports 112 and 114. Spaced in this fashion, the plate is supported by three points placed 120 degrees apart preventing undesirable tilting. The bar 130 pivotally supported by the pivotal arrangement 128 at the top where it engages the plate 106 is extended downwardly inside the nozzle until it projects below the bottom of the flange 84. An aperture 132 is let into the closure 86 to receive the extension of the rod 130 and thus lock it in the closed position. The aperture 132 is made sufficiently larger than the rod 130 to permit closing and opening of blind flange 86 without unintentionally moving the latch 116.

A further locking element is added to the rod 130 of the latch 116 in the form of the stud 134 which projects into an opening 136 made to receive it in the internal wall of the nozzle 12. By this means the plate 106 is rapidly and automatically aligned and supported. Additionally, this means retains the plate 106 in supporting position when the closure 86 is removed on initially opening the nozzle 12 for discharge purposes.

Figures 5 and 6 show the details of chute 16 which connects the nozzle 12 with the receiving means 10 both previously detailed. Flange 160 drilled to receive bolts 94 after blind flange 86 is released, fits into operating connection with flange 84 of nozzle 12 as shown in Figure 5. Spaced ears 162 apertured to receive lifting means (not shown) afford the means of lifting the chute into connecting position.

The chute assembly 16 in addition to the fastening flange 160 and positioning means, includes elements for starting, agitating and controlling the flow of material to be discharged from the vessel 14. The flange 160 is apertured as at 164 in line with the bar 130 of the latch mechanism 116 to facilitate the initial release of plate 106. Once having been dislodged, assisted by the ram 170 if necessary, as explained later, plate 106 and the latch mechanism falls into the enlarged section 166 of chute 16 clear of the dislodging mechanism 168 which includes the ram 170 and ram positioning sleeves 172 and 174. The sleeve cap 176 completes the positioning sleeve closure holding the ram elements in operating engagement with the chute.

Finally a drive gate 180 and adjustable collar 200 complete the description of the chute assembly, and also of the combination. As will be better understood after reading the description of the operation following later, these sub-combinations form auxiliary devices for the flow control of the discharged material. A pair of adjacent flanges 182 and 184 are the connecting means between the upper and lower sections of chute 16, 186 and 188 respectively. Bolts 190 hold these flanges together as shown in Figures 5 and 6. By separating the flanges with a spacer 192, they are spaced to receive a sliding member 194 which is apertured at 196 the full dimension of the connected portions of the chute 186 and 188. The aperture 196 in member 194 is positioned to control the opening between the connected chute portions as a regulating means for the flow of material through the chute 16. The collar 200 adjustable vertically on the lower portion 188 of the chute 16 and in which fixed plates and baffles form a spiral receiver 202 is inserted to break the fall of the discharged material as it descends to the receiver means 10, terminates the lower section 188 and forms the connector for operably engaging the discharge material receiving means previously shown in Figure 1.

To emphasize the utility and facility of the combined elements and sub-combinations forming the complete device, a discharge operation will be described. The example used will be that of platinum catalyst which, in this case, is supported in vessel 14 on a bed of alumina balls. By such an example the use of the described receiving means will be emphasized.

Previous to opening the nozzle 12 of the vessel 14, the blind flange 86 and plate 106 being positioned as shown in Figure 3, the receiving means 10 is rolled into position on wheels 22. Jacks 34 are set, securing the receiver and leveling it for operation. Roller conveyor extensions 26 and 39 are attached to the roller bed of the receiver and the first receiving drum 54 moved on the bed 32 of scale 30.

Blind flange 86 is released by disengaging bolts 94, and it falls clear of the nozzle to assume a position as shown in Figure 1. The upper flange 160 of chute 16 is positioned in operating contact with flange 84 and bolted securely. Vertically adjustable collar 200 on the lower end of chute 16 is abutted and secured on receiver flange 48. As a precautionary measure the sliding member 194 of the driving gate may be adjusted to interrupt all or a portion of the initially released supporing alumina balls of the example as a protection for the screw drive 42 of the receiver to assist the spiral interrupter 202 in collar 200.

The material to be discharged is released to flow or is exposed for operation of ram 170 by driving a pin into aperture 164 against the latch bar 130. Unlocked by removing blind flange 86, the latch end projecting into slot 132 is free, lug 134 is driven from slot 136 by the pin and plate 106 is free to drop, being supported only by the two lugs 112 and 114. Normally, the plate thus released will fall clear of the downwardly pressing material, and will assume a position as shown in Figure 5. Should it not fall, the ram 170 directed to the latch-released third point of the plate 106 will be available to release it. The discharge material, alumina balls and spent platinum catalyst of the example will fall into the chute 16, and enter the receiving means through the retarding collar 200. Should there be a reason to stop the flow of material through the chute 16, the drive gate slide 194 can be driven through the chute to shut off the major portion of the material to be delivered, permitting disengagement and repair without losing the valuable catalyst.

Referring again to Figure 1, the released material will enter the cylindrical casing 40 enclosing the screw feed 42 and will be moved to the delivery connection in direct proportion to the screw feed speed. The electrical switch 68, both manually and automatically controlled, as by the operator and the scale 30, regulates the amount delivered to the container 54. In the problem given, this is a necessary feature because of the difference in weight of the possible mixtures obtainable from the alumina ball supported platinum catalyst material.

Once the predetermined weight is reached, the screw feed 42 stops the delivery operation, thus holding the discharge of material in the vessel and chute. Lever 60 lifts the receptacle cover 58 upwardly collapsing the expandable section 56, and the container 54 can be moved to conveyor section 39 and away for recovery purposes. The next receptacle is moved into place on the scale, the cover 58 clamped in position by lever 60 and screw feed 42 started again.

This procedure is followed until vessel 14 is completely unloaded using ram 170 and driving gate 194 where necessary. Once emptied, the chute 16 is released, plate 106 which is retained by chain 118 in operating position is replaced and latched, and blind flange 86 bolted into place. The latch mechanism 116 is returned to a securely maintained position in slot 132 and by lug 134 engaging slot 136. Seal ring 92 resumes its operating position and vessel 14 is ready for recharging.

By combining the described elements and subcombinations into the device as disclosed, an unloading means especially adapted to removing recoverable catalysts or poisonous materials in present day processes is demonstrated. Particularly in the use of such a valuable catalyst as platinum, described in the illustrative example, it is economically necessary to recover all the spent material and not just a portion of it. The confinement of dust common in such operations is immediately recognizable as advantageous especially where such discharged materials are poisonous or the cause of respiratory diseases. And, by regulating the weight of each discharged volume, a rapid, easily handled quantity is received and quickly dispatched.

What is claimed is:

1. An auxiliary closure means for reactor nozzles comprising a plate peripherally adapted to cooperate with the interior wall of the nozzle, two lugs mounted in spaced relation within the nozzle to support said plate, a chain retainer connected to the nozzle interior and the plate, and a bar-latch pivotally connected to the plate to form a third point of suspension, said latch extending downwardly of the nozzle to a point below the same and provided with a lug on said bar to engage the inner wall of the nozzle above the opening.

2. A chute to direct and control discharged material from reactor nozzles comprising upper and lower sections, an engaging flange on the top of the upper section to connect to the nozzle, a ram extending through the upper section directed to enter the nozzle of the reactor, a lower flange on the upper section and an upper flange on the lower section adapted to engage in spaced relation, a drive gate between said flanges apertured to control material flow between the sections, and a collar in slidable engagement with the bottom of the lower section having baffles therein to retard the discharge of falling material.

3. An apparatus through which solid materials from a reaction vessel are controllably discharged in successive streams of predetermined weight into successive receivers, the same comprising a nozzle outlet flanged at the bottom, a bottom closure adapted to releasably engage the flanged portion of the nozzle externally thereof, a chute attachable to the nozzle flange in place of the bottom closure, an auxiliary closure plate positioned within the nozzle and spaced above said bottom closure, means adapted to hold said plate in the closed position but releasable after the bottom closure is released, permitting the plate to drop into position allowing free flow of material from the nozzle to the chute, a conveyor below and communicating with the chute which receives material from the chute and conveys it to a discharge, means adapted to support a receiver in position to receive material from said discharge, and means to stop the flow of material from the conveyor discharge to the receiver upon the receipt by the receiver of a predetermined weight of material.

4. The apparatus defined in claim 3 comprising also a baffled collar affording flow connection between the chute and the receiving end of the conveyor.

5. The apparatus defined in claim 4 comprising also a drive-gate between the chute and the collar operable to control the flow of material from the chute to the collar.

6. A reactor discharge device comprising a nozzle outlet for the reactor having a flange and a blind flange hinged thereto, an auxiliary closure plate loosely positioned in the nozzle above the blind flange, fixed supports in the nozzle positioned to partially hold the plate, a bar-latch completing the support of the plate on the lugs and extending to engage the blind flange below the nozzle, a chain anchoring the plate to the nozzle at extended distance therefrom, a chute flanged to engage the nozzle flange and slotted for engaging the latch bar through said flange, a ram extending through the wall of the chute to operably engage the auxiliary closure plate, a drive-gate in said chute to control the flow of discharged material therethrough, and a baffled receiving collar slidably engaging the bottom of the chute.

7. A reactor discharge device comprising a nozzle outlet for the reactor having a flange and a blind flange hinged thereto, an auxiliary closure plate loosely positioned in the nozzle above the blind flange, fixed supports in the nozzle positioned to partially hold the plate, a bar-latch completing the support of the plate on the lugs and extending to engage the blind flange below the nozzle, a chain anchoring the plate to the nozzle at extended distance therefrom, a chute flanged to engage the nozzle flange and slotted for engaging the latch bar through said flange, a ram extending through the wall of the chute to operably engage the auxiliary closure plate, a drive-gate in said chute to control the flow of discharged material therethrough, a baffled receiving collar slidably engaging the bottom of the chute, a screw-feed conveyor having an inlet on the receiving end positioned to engage the collar of the chute and an outlet on the discharge end, a scale adjacent the outlet of said screw-feed conveyor, receptacle means cooperating with said scale to receive the conveyor discharge, receptacle cover means retractably extending from the conveyor outlet to sealably engage the receptacle, and electrical control means connecting the scale and conveyor.

References Cited in the file of this patent
UNITED STATES PATENTS

| 1,419,557 | Gase | June 13, 1922 |
| 2,212,419 | Harmon | Aug. 20, 1940 |
| 2,702,684 | MacLeod | Feb. 22, 1955 |